No. 709,556. Patented Sept. 23, 1902.
C. H. PRÖTT.
APPARATUS FOR DISPERSING LIQUIDS OR MAKING SPRAY.
(Application filed June 14, 1902.)

(No Model.)

Witnesses:

Inventor:

UNITED STATES PATENT OFFICE.

CARL HEINRICH PRÖTT, OF RHEYDT, GERMANY.

APPARATUS FOR DISPERSING LIQUIDS OR MAKING SPRAY.

SPECIFICATION forming part of Letters Patent No. 709,556, dated September 23, 1902.

Application filed June 14, 1902. Serial No. 111,631. (No model.)

*To all whom it may concern:*

Be it known that I, CARL HEINRICH PRÖTT, a citizen of the German Empire, residing at Rheydt, in the Province of Rhenish Prussia and Kingdom of Prussia, Germany, have invented certain new and useful Improvements in Apparatus for Dispersing Liquids or Making Spray; and I do hereby declare the following to be a full, clear, and exact description of the invention, such as will enable others skilled in the art to which it appertains to make and use the same.

The present invention has for its object an improved apparatus by means of which the air in rooms—say in factory-rooms, in rooms of hospitals, and others—can be saturated with liquids in a fine spray like a fog or vapor and whereby the liquid may be mixed with solutions of chemicals for sanitary purposes or with odoriferous bodies for perfuming the air or where pure water only may be used for technical purposes—as, for instance, in cotton-mills. I attain this object by bringing the liquid to be dispersed in fine dust upon a disk rotating very quickly, so that the liquid by the action of centrifugal force will be thrown out in all directions in a fine spray, but whereby this spray or these fine particles of liquid will be thrown against the wings or into the cells of a fixed ring surrounding the rotary disk and composed of a great number of vanes or wings standing out radially inwardly from a ring to which they are fixed, and thus forming cells open on all sides except at the outer circumference, so that a current of air driven into or through the cells from above carries away the vapor into the room where the apparatus is erected.

Figure 1:
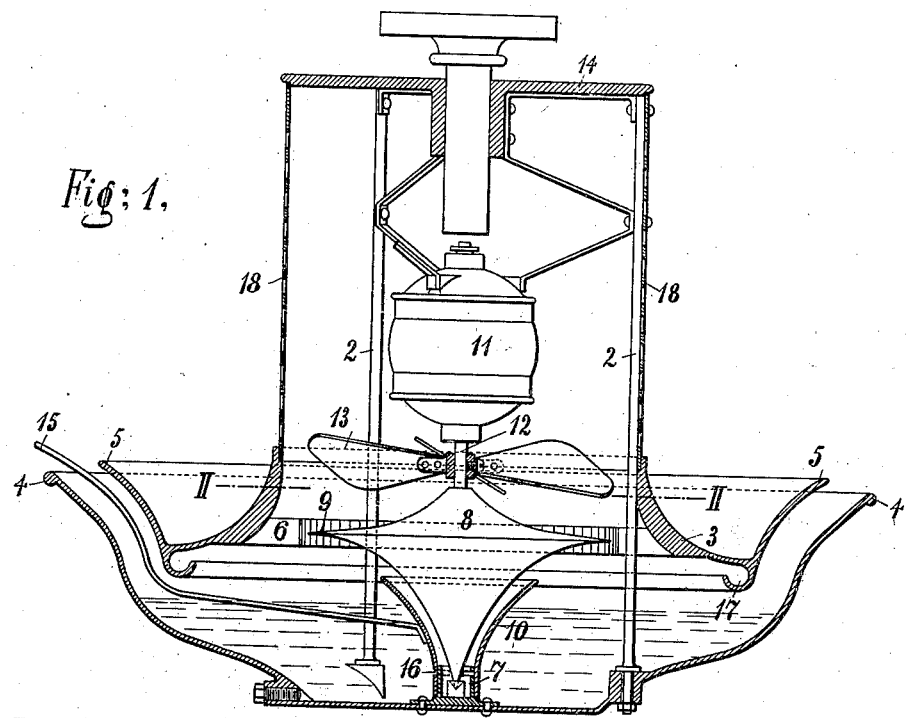
Figure 2:
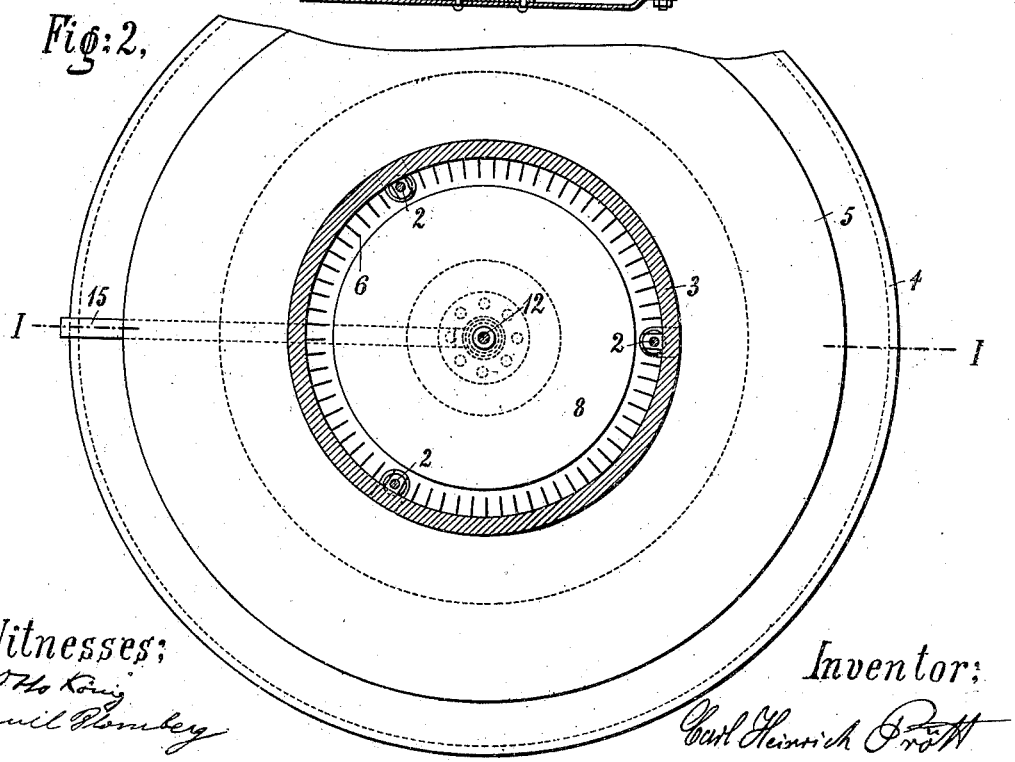

On the accompanying drawings I show the new apparatus in Figure 1 in a central vertical section along line I I of Fig. 2, and in Fig. 2 in a horizontal section along line II II of Fig. 1.

The apparatus is composed of a basin 1, of glass or metal. On columns 2, fixed to the bottom of the basin 1, is held centrally to the latter a U-shaped ring or trough 3 of somewhat smaller exterior diameter than the outer edge of the basin and open in the middle, so that a relatively narrow ring-shaped passage between the outer edges 4 and 5 of the basin 1 and of the trough 3, respectively, is left free.

At the inner edge of the trough 3 are arranged a number of radial wings 6. In the center of the basin 1 is fixed to its bottom a pot 7, serving as a bearing for the rotary distributer 8. This consists of a parabolic piece running out at its largest diameter in a horizontal disk 9. The lower parabolic circumference is finely polished, and the disk 9 stands about in the middle of the wings 6 of the trough 3. The lower part of the paraboloid is surrounded by a similarly-shaped casing 10, fixed to the outside of the pot 7 and leaving only a relatively narrow space between both. The upper side of the paraboloid is coupled to the spindle 12 of an electromotor 11, mounted between the columns 2, so that when said motor is at work it will take around the paraboloid at a very high speed. Between the electromotor and disk 8 is fixed upon the spindle 12 a fan 13, having its wings so shaped that it forces the air downward through the cells formed by the wings 6 of the trough 3.

It will of course be understood that the paraboloid instead of being driven by an electromotor may be driven by any other motive force. The spindle 12 then would be prolonged outside of the cover 14, where it would be provided with a pulley or other suitable means for receiving power.

The casing 10 is made adjustable—that is to say, it can be turned around by a handle 15, so as to regulate the entrance of liquid into the interior of the casing 10 by the slits 16 in the circumference of this casing and in the pot 7.

The inner side of the trough 3 has a channel 17 at its lower edge for taking up drops of water which may gather there.

A perforated sheet-iron casing 11 may be put around the upper part of the apparatus.

The working of the apparatus is as follows: The basin 1 is filled with water or other liquid, but so much only that there is left a free passage between the surface of the water and the lower edge of the channel 17 or of the trough 3, respectively, about equal in width to the distance between the basin and the trough near their upper edges. The casing 10 with regard to the pot 7 is so adjusted that water can enter through the slits 16 into the interior of the casing in sufficient quantity. The paraboloid 8 9 is then made to turn rapidly with the fan 13 by the electromotor or by some other motive power. In consequence of this quick rotation the liquid rises along the periphery of the paraboloid 8 and is thrown out at the edge of the disk 9 by the centrifugal force and dispersed in a spray against the wings 6. The stream of air blown downward through the cells by the fan 13 supports the dispersing action, and thus it follows that the air saturated with the spray is driven out at the circumference 4 of the basin 1 in as perfect manner as can be desired.

I am aware that various apparatus have been devised for distributing liquid in a fine spray and for saturating air with water, and I do not, therefore, claim, broadly, such an apparatus; but What I do claim, and desire to secure by Letters Patent, is—

1. In an apparatus for dispersing liquids or making spray a basin 1 containing the liquid to be dispersed in combination with a paraboloid-shaped body 8 ending in a horizontal disk 9, a pan or bearing 7 carrying the foot of said paraboloid, a spindle 12 at top of the paraboloid, a fan 13 keyed to said spindle, an electromotor driving said spindle and the paraboloid, columns 2 fixed to the bottom of the basin 1, a U-shaped trough 3 fixed to said columns centrally over the basin 1, so as to leave an annular space between the side of the basin 1 and the outside edge of the trough, a series of radial wings 6 forming cells and arranged exactly in the level of the disk 9 at the inner side of the trough 3, the whole as described and illustrated and for the purpose set forth.

2. In an apparatus for dispersing liquids or making spray a basin 1 containing the liquid, columns 2 fixed to the bottom of said basin, a U-shaped trough 3 fixed to said columns centrally over the basin so as to leave an annular space between the side of the basin 1 and the outer edge of the trough 3, a channel 17 at the foot of the trough 3, wings 6 projecting radially inward from the inner side of the trough, in combination with a rotating paraboloid-shaped body 8 guided in a pan 7 fixed to the bottom of the basin 1, a spindle 12 projecting upward from the top of the paraboloid 8, a fan 13 keyed to said spindle, an electromotor coupled to the spindle and driving the same at a high speed, a perforated casing 18 surrounding the upper part of the apparatus, a cover 14 at top of said casing 18, an adjustable casing 10 surrounding the lower part of the paraboloid and the pan 7, slits 16 in said casing 10 and in the pan 7, a hand-lever 15 for adjusting the width of opening of the slits 16 and regulating the flow of liquid into the space inside of the casing 10, the whole as described and illustrated and for the purpose set forth.

In testimony whereof I have affixed my signature in presence of two witnesses.

CARL HEINRICH PRÖTT.

Witnesses:
OTTO KÖNIG,
EMIL BLOMBERG.